United States Patent [19]

Ueda et al.

[11] 4,350,421
[45] Sep. 21, 1982

[54] CAMERA WITH A BUILT-IN WINDER

[75] Inventors: Hiroshi Ueda, Nara; Shigeru Oyokota, Sakai, both of Japan

[73] Assignee: Minolta Camera Kabushiki Kaisha, Azuchi, Japan

[21] Appl. No.: 234,217

[22] Filed: Feb. 13, 1981

[30] Foreign Application Priority Data

Feb. 15, 1980 [JP] Japan .................................. 55-18005

[51] Int. Cl.$^3$ ........................ G03B 1/18; G03B 17/42; G03B 19/12
[52] U.S. Cl. ................................... 354/152; 354/173; 354/205; 354/206; 354/214; 354/270
[58] Field of Search ............... 354/152, 153, 170, 171, 354/270, 173, 271, 204–206, 213, 214

[56] References Cited

U.S. PATENT DOCUMENTS 3,598,033 8/1971 Sasaki .................................. 354/214
4,106,041 8/1978 Lange .................................. 354/206
4,204,759 5/1980 Yamada et al. ..................... 354/152

Primary Examiner—Donald A. Griffin
Assistant Examiner—William B. Perkey
Attorney, Agent, or Firm—Wolder, Gross & Yavner

[57] ABSTRACT

A single lens reflex camera has a built-in winder which includes a reciprocating member reciprocatable in response to forward and reverse rotations of a motor for automatic charge-up of the camera mechanisms as well as for automatic film wind-up.

A charge-type drive mechanism has a charge member which is pushed by the reciprocating member upon the forward movement of the latter due to the forward rotation of the motor to move forward for causing the charge-type drive mechanism to store a driving force.

The reciprocating member retracts from the charge member upon its return movement so as not to impede return movement of the charge member. An operation mechanism such as a shutter is operated for photographing under the driving force stored in the charge-type drive mechanism, accompanying return movement of the charge member. A film advance mechanism advances a film in response to the return movement of the reciprocating member due to the reverse rotation of the motor. Furthermore, clutch mechanisms interlocked with a manual selection member are capable of connecting the motor to a film rewinding shaft while disconnecting the motor from the reciprocating member, so that automatic film rewinding is also made possible.

12 Claims, 17 Drawing Figures

CAMERA WITH A BUILT-IN WINDER

BACKGROUND OF THE INVENTION

1. Field of the Invention

The present invention relates to a camera with a built-in winder which is capable of automatic film advance, as well as charging the shutter, diaphragm and mirror mechanisms.

2. Description of the Prior Arts

Drive mechanism for use in single-lens reflex cameras are classified broadly into the following two types: (1) A charge-type or force storing type drive mechanism, i.e., when charged, it stores external energy once in a spring and the like as a driving force, and instantaneously discharges the stored driving force to ensure the efficient start-up of diaphragm, mirror and shutter mechanisms for their timely and prompt operation to thereby expose a film. (2) A film advance drive mechanism, i.e., it directly uses external force as a driving force for film wind-up.

In recent years, there have been proposed cameras which use a single film advance motor provided therein as an external energy source to actuate such two types of drive mechanisms for automatically winding a film and charging the diaphragm, mirror and shutter mechanisms. These cameras are more simplified in construction as compared with those which are automatically operated by external forces given to the two types of drive mechanisms from the respective motors.

When, however, film advance and the charge of diaphragm, mirror and shutter mechanisms are performed by a movable member driven by the single film advance motor, the movable member, after charging a charge-type drive mechanism on one side, must be retracted outside the operation path of a drive member in the charge-type drive mechanism, so that the operation of the charge-type drive mechanism may not be impeded. The drive member returns along the operation path under the action of stored force for operation of the charge-type drive mechanism. On the other hand, a film advance mechanism is originally designed to be driven always in one direction to wind a film, requiring no retracting operation. Therefore, prior art cameras are provided with a clutch between a film advance mechanism and a charge-type drive mechanism to release the clutch when film advance has been completed, so that the film advance mechanism may be prevented from following the operation of the charge-type drive mechanism. However, this makes the camera construction complex. In addition, prior art cameras are designed to have part of the charge-type drive mechanism charged simultaneously with film advance, requiring the output force of the motor for use as an external energy source to be sufficiently strong. This, in turn, increases the motor capacity, causing a load balance between the forward and reverse motor rotations to deteriorate, and driving efficiency to decrease.

SUMMARY OF THE INVENTION

Accordingly, it is an object of the present invention to provide a camera with a built-in winder which eliminates the above described drawbacks, and which uses a single motor to automatically charge a charge-type drive mechanism for actuating diaphragm, mirror and shutter mechanisms as well as to automatically advance a film.

Noticing that the energies required for the charge-type drive mechanism and the film advance drive mechanism are almost equal to one another, the present invention proposes a camera with a built-in winder which is characterized in that a charge-type drive mechanism is charged by the forward movement of reciprocating means due to the forward rotation of a motor whereas the reciprocating means is returned due to the reverse rotation of the motor to be retracted outside the operation path of a drive member in the charge-type drive mechanism, and at the same time, a film advance drive mechanism is operated, thereby eliminating need of a reciprocating means retracting mechanism having a complex construction, such as a clutch to be otherwise provided between the reciprocating means and the charge-type drive mechanism.

That is to say, the present invention is characterized in that no complicated clutch mechanism is required between the reciprocating means and the charge-type drive mechanism, and moreover, the output energies required for the forward and reverse motor rotations are almost equal to one another. Therefore, the loads exerted on the motor upon the forward and reverse rotations of the motor are balanced and the reciprocating strokes of the reciprocating means become equal to one another, whereby a motor drive mechanism including the reciprocating means is automatically returned to its initial state in a photographic cycle.

Furthermore, the present invention proposes definite ideas for an embodiment, wherein the charge-type drive mechanism and the film advance drive mechanism can be easily charged and operated respectively by the linear reciprocating motion of a single reciprocating means, and wherein a motor drive mechanism is constructed into a compact unit including a linear reciprocating output section, so that it can be conveniently built into a camera.

The present invention further proposes a camera with a built-in winder, in which the motor drive mechanism unit includes a rotary output section in addition to the linear reciprocating output section, and these two output sections are selectively and alternatively made operative by a clutch, thereby allowing the rotary output section to automatically rewind a film as well.

DESCRIPTION OF THE PREFERRED EMBODIMENTS

Figure 1:
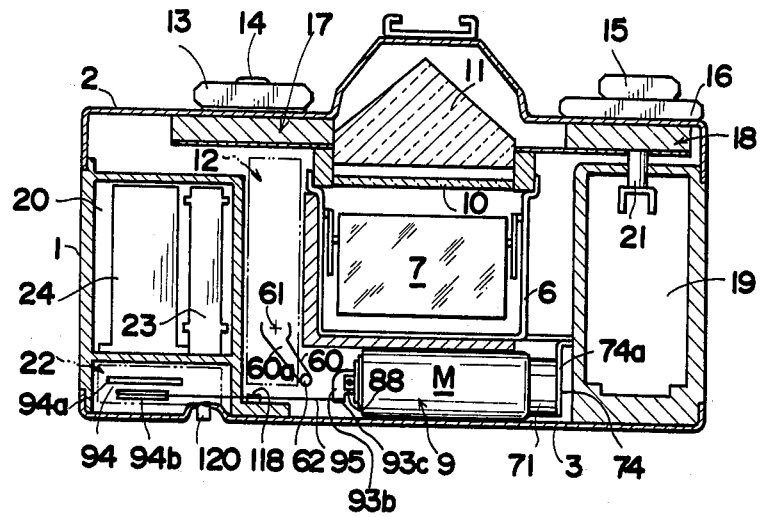
FIG. 1 is a longitudinal front view of a single-lens reflex camera according to an embodiment of the present invention.
Figure 2:
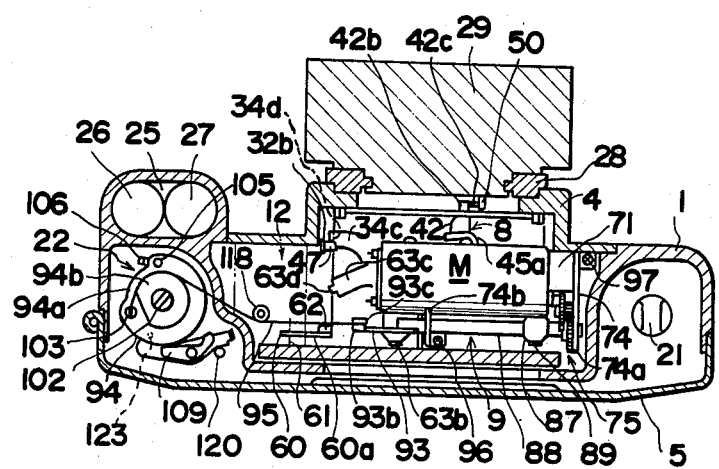
FIG. 2 is a transverse bottom view of the camera.
Figure 3:
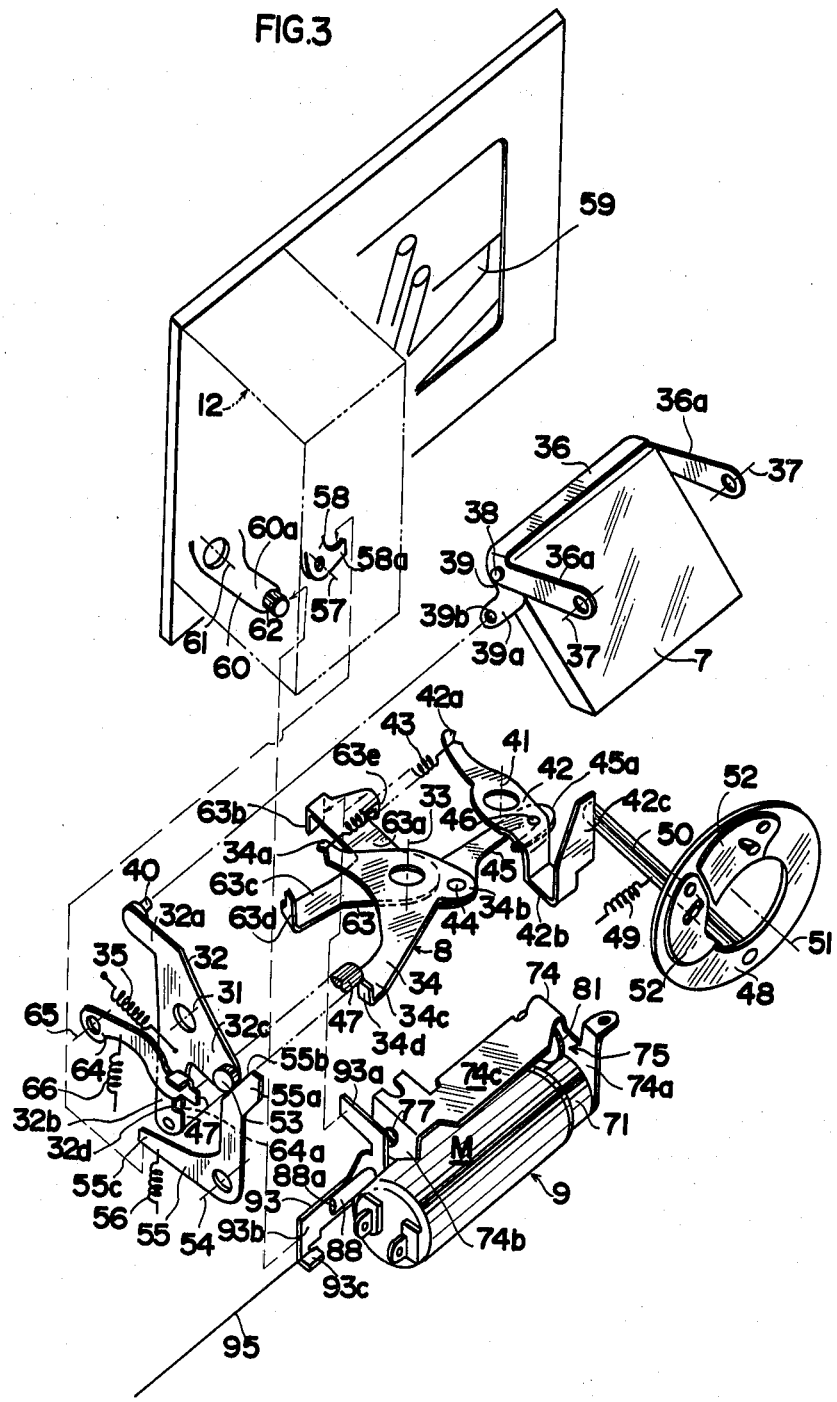
FIG. 3 is an exploded perspective view of the essential parts of the camera.
Figure 4:
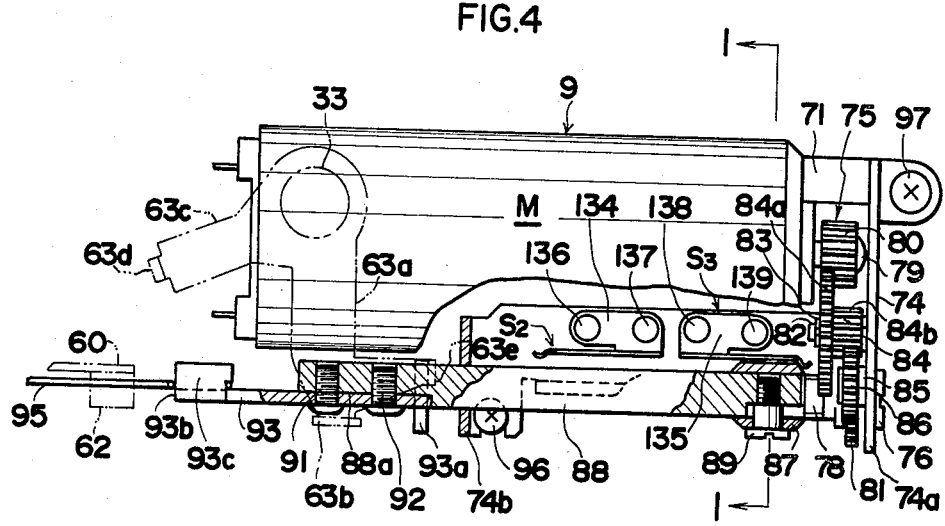
FIG. 4 is a bottom view partly in section of a motor drive mechanism.
Figure 5:
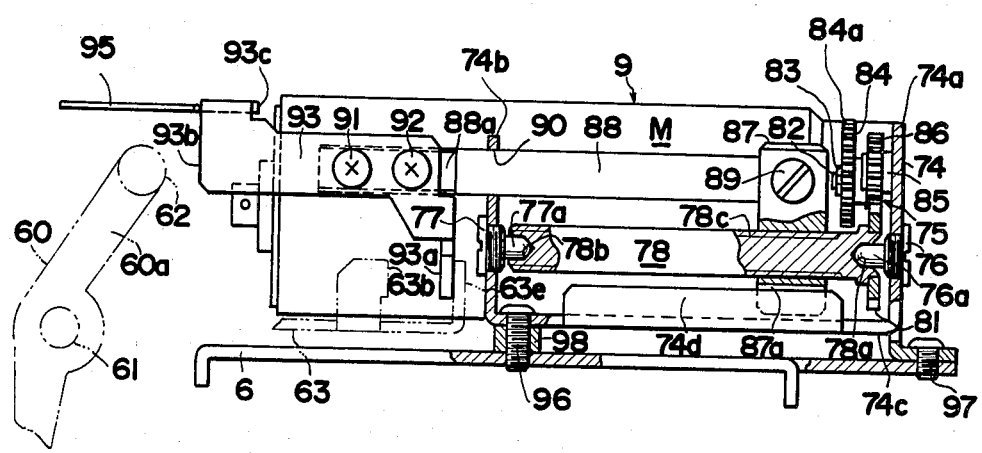
FIG. 5 is a view partly in section of the motor drive mechanism seen from downward in FIG. 4.
Figure 6:
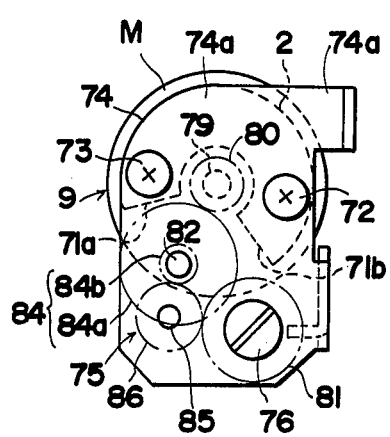
FIG. 6 is a side view of the motor drive mechanism seen from the right in FIG. 4.
Figure 7:
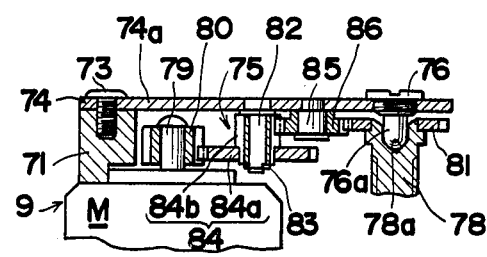
FIG. 7 is a cross-sectional view of the output section of the motor drive mechanism.
Figure 8:
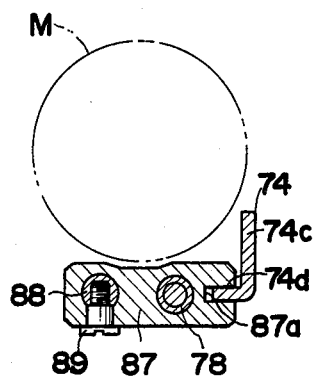
FIG. 8 is a cross-sectional view of the motor drive mechanism seen from line I—I in FIG. 4.

FIGS. 1 and 2 show the construction of a camera with a built-in winder according to a first embodiment of the present invention, the construction including metal die-cast or plastic body 1, top cover 2, bottom cover 3, front frame 4 and rear cover 5, which constitute the exterior of a camera body together. Arranged in mirror box 6 secured to front frame 4 and disposed at the center towards the front inside body 1 are mirror 7, diaphragm-mirror drive mechanism 8 as shown in FIG. 3 and motor drive mechanism 9. A frame fixed to front frame 4 holds a viewfinder optical system including pint glass 10, pentagonal roof prism 11 and others, and shutter drive mechanism 12 is also secured to the rear of mirror box 6. Arranged on top cover 2 are shutter dial 13, shutter release button 14, film rewind knob 15 and film sensitivity setting dial 16. Furthermore, beaneath top cover 2 are exposure control device 17 including an electric circuitry and mechanical parts related to exposure control and film rewind mechanism 18.

Film housing chamber 19 and film take-up chamber 20 are formed on both sides of camera body 1. A film patrone is loaded into film housing chamber 19. Film rewind shaft 21 linking with film rewind knob 15 moves downward out of film rewind mechanism 18 into film housing chamber 19. Arranged in film take-up chamber 20 are film advance sprocket 23, which is rotated for film advance by film advance mechanism 22 located beneath film take-up chamber 20, and film take-up spool 24. Battery housing chamber 25 formed in camera body 1 houses batteries or power cells 26 and 27. Lens mount seat plate 28 is fixed to the front of front frame 4 and exchangeable lens 29 is detachably mounted thereon.

As shown in FIG. 3, diaphragm-mirror drive mechanism 8 is provided with mirror drive lever 32 pivotally supported by shaft 31 on the side wall of mirror box 6 and diaphragm drive lever 34 pivotally supported by shaft 33 on the floor wall or mirror box 6. Mirror drive lever 32 is biased clockwise by mirror drive spring 35, and the top ends of mirror 7 are pivotally supported by shaft 38 on the free end portions of arms 36a of mirror support 36 whose arms 36a are pivotally supported by shafts 37 on both sides of mirror box 6. Hole 39b is formed on passive arm 39a projecting from mirror fixing frame 39 fixed to the top edge of mirror 7, and mirror operating pin 40 on first upward arm 32a of mirror drive lever 32 is inserted into hole 39b. When lever 32 is rotated clockwise under the action of spring 35 from the charged position as shown in FIG. 3, mirror 7 is rotated upwards until it becomes parallel with pint glass 10 thereunder by means of a link mechanism comprising arm 32a, passive arm 39a and side arms 36a, thereby retracting from the photographic optical path to allow film exposure.

On the other hand, diaphragm drive lever 34 is interconnected with diaphragm preset lever 42 pivotally supported by shaft 41 on the floor wall of mirror box 6 on one side of diaphragm drive lever 34. Diaphragm drive tension spring 43 is secured to first arms 34a and 42a of both levers 34 and 42 by its opposite ends, while connecting lever 45 is pivotally supported by shaft 44 on second arm 34b of diaphragm drive lever 34 by its one end and slidably engaged with connecting pin 46 on second arm 42b of diaphragm drive lever 42 by its opposite end, so that levers 34 and 42 are together biased clockwise by the tensioning force of spring 43 in accordance with, for example, the lever ratio of first arms 34a and 42a.

In addition, diaphragm drive lever 34 has passive bent piece 34d at the tip of third arm 34c, which under the clockwise bias of spring 43 engages passive pin 47 carried by the tip of second arm 32b of mirror drive lever 32. Diaphragm drive lever 34 follows the clockwise rotation of mirror drive lever 32, rotating clockwise together with connecting lever 45 and diaphragm preset lever 42. Diaphragm preset lever 42 has diaphragm actuating arm 42c bent upwards at the tip of second arm 42b, and diaphragm drive ring 48 of exchangeable lens 29 mounted on the camera is biased clockwise by spring 49. Diaphragm connecting pin 50 carried by diaphragm drive ring 48 abuts on diaphragm actuating arm 42c. When diaphragm preset lever 34 is rotated clockwise together with diaphragm drive lever 34, diaphragm drive ring 48 is also rotated clockwise along optical axis 51 by diaphragm connecting pin 50 following diaphragm actuating arm 42c, thereby operating a plurality of diaphragm blades 52 arranged on diaphragm drive ring 48, whereby a diaphragm consisting of diaphragm blades 52 is stopped down to a preset aperture size set by a diaphragm aperture setting mechanism (not shown).

Furthermore, shutter actuating pin 53 is carried by the tip of third arm 32c of mirror drive lever 32, and leading shutter curtain release lever 55 pivotally supported by shaft 54 on the side wall of mirror box 6 is biased counterclockwise by spring 56 so that cam surface 55b at the tip of first arm 55a abuts on shutter actuating pin 53. The tip of second arm 55c of lever 55 is opposed to passive arm 58a of leading shutter curtain stop lever 58 pivotally supported by shaft 57 provided in shutter drive mechanism 12. At the end of the rotation of mirror drive lever 32 in diaphragm-mirror drive mechanism 8 after the mirror upward rotation and diaphragm stopping-down operation have been completed, leading shutter curtain release lever 55 is released from being depressed by shutter actuating pin 53 on cam surface 55b to rotate counterclockwise under the action of spring 56, causing second arm 55c to push passive arm 58a of leading shutter curtain stop lever 58 so that lever 58 is rotated clockwise. As a result, leading shutter curtain 59 operates to start film exposure, and after a lapse of required exposure time, exposure control mechanism 17 actuates the trailing shutter curtain to complete the film exposure.

It should be noted that shutter charge lever 60 provided in shutter drive mechanism 12 is pivotally supported by shaft 61. When passive pin 62 carried by the tip of passive arm 60a, is pressed, shutter charge lever 60 is rotated clockwise, whereby leading shutter curtain 59 and the trailing shutter curtain are charged. In addition, diaphragm-mirror drive mechanism 8 has diaphragm-mirror charge lever 63 which is pivotally supported by shaft 33 of diaphragm drive lever 34. Formed on the tip of first arm 63a of diaphragm-mirror charge lever 63 is passive piece 63b, and on the tip of second arm 63c is actuating piece 63d opposing to passive pin 47 on mirror drive lever 32. When passive piece 63b is pressed to cause diaphragm-mirror charge lever 63 to rotate counterclockwise, actuating piece 63d presses passive pin 47 on mirror drive lever 32, so that mirror drive lever 32 is rotated counterclockwise, and at the same time, diaphragm drive lever 34 is rotated counterclockwise through passive pin 47, whereby diaphragm-mirror drive mechanism 8 is charged again as shown in FIG. 3.

Diaphragm-mirror release lever 64 of diaphragm-mirror drive mechanism 8 is pivotally supported at one end by shaft 65 on the side wall of mirror box 6 and is biased clockwise by spring 66. Stopper 64a of diaphragm-mirror release lever 64 engages stop piece 32d bent on the side of second arm 32b of mirror drive lever 32 so that diaphragm-mirror drive mechanism 8 is restricted in its charged state shown in FIG. 3. Upon depression of shutter release button 14, diaphragm-mirror release lever 64 is rotated counterclockwise to release diaphragm-mirror drive mechanism 8 from its charged state, and mirror drive lever 32 and diaphragm drive lever 34 instantaneously discharge the external energy stored in springs 35 and 43 for their timely and prompt operation.

Motor drive mechanism 9 is formed into a unit as shown in FIGS. 1, 2 and 4 through 9, and reversible motor M is fixed by screws 72 and 73 through spacer 71 to side wall 74a at one end of base plate 74. Spacer 71 is formed integrally with motor M and is provided with cut porltions 71a and 71b so that it may not interfere with drive gear system 75 which transmits the rotation of motor M to charge diaphragm-mirror drive mechanism 8 as well as to actuate film advance mechanism 22. Particularly, drive gear system 75 transmits the rotation of motor M to feed screw 78 which is arranged in parallel with motor M and which is supported at its both sides by bearing projections 76a and 77a of screws 76 and 77 received in bearing holes 78a and 78b. Screws 76 and 77 are screwed into both side walls 74a and 74b of base plate 74 from the exterior. Drive gear system 75 consists of drive gear 80 fitted to rotor shaft 79 of motor M, driven gear 81 fitted to feed screw 78, first intermediate gear 84 which is mounted on one end wall 74a of base plate 74 by shaft 82 and E ring 83, and second intermediate gear 86 which is mounted on end wall 74a of base plase 74 by shaft 85. First intermediate gear 84 has integral large diameter and small diameter gears 84a and 84b, of which large diameter gear 84a is meshed with drive gear 80 while small diameter gear 84b is meshed with second intermediate gear 86.

Figure 9:
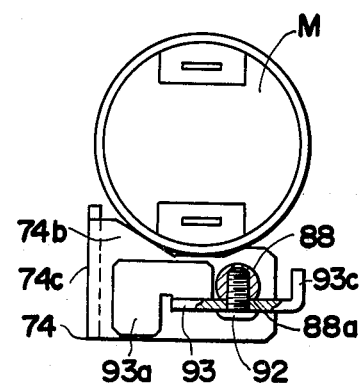
FIG. 9 is a side view partly in section of the motor drive mechanism seen from the left in FIG. 4.

Reciprocating slider 87 has a female thread opening engaged with male thread portion 78c of feed screw 78. Guide groove 87a cut on slider 87 in parallel with feed screw 78 is slidably fitted to bent guide wall 74d formed in parallel with feed screw 78 on one edge of base portion 74c of base plate 74 so that slider 87 cannot be rotated but may reciprocate in the linear left and right directions in response to the forward and reverse rotations of motor M in FIGS. 2, 4 and 5. Fitted into slider 87 is one end of movable shaft 88 which is secured to slider 87 by stepped screw 89 to be in parallel with feed screw 78. The other end of movable shaft 88 is slidably fitted into guide hole 90 provided on other end wall 74b of base plate 74 so that movable shaft 88 may reciprocate integrally with slider 87. Flat surface 88a formed at the other end of movable shaft 88 has reciprocating charging member 93 secured thereto by two screws 91 and 92 as shown in FIG. 9. Formed on charging member 93 are diaphragm-mirror charging projection 93a which pushes passive piece 63b of diaphragm-mirror charge lever 63 to charge diaphragm-mirror drive mechanism 8 when charging member 93 is moved forward to the left in FIGS. 3 through 5, and shutter charging projection 93b which pushes passive pin 62 of shutter charge lever 60 to charge shutter drive mechanism 12, respectively. Charging member 93 and diaphragm-mirror charge lever 63 constitute reciprocating means together with reciprocating slider 87 and movable shaft 88.

Furthermore, charging member 93 carries film advance projection 93c connected to one end of film advance cord or string 95, the other end of which is coupled to film advance wheel 94, which winds up film F (FIG. 11) by one frame each time film advance mechanism 22 is operated forward. When charging member 93 is returned to the right, film advance wheel 94 is rotated forward through film advance cord 95 to wind up film F. The unit of motor drive mechanism 9 is fixed to the underside of the floor wall of mirror box 6 by screws 96 and 97 with spacer 98 interposed therebetween. It is to be noted that mirror charge lever 63 has another auxiliary passive piece 63e which opposes diaphragm-mirror charging projection 93a of charging member 93 at the opposite side of passive piece 63b. When charging member 93 is returned to the right, projection 93a pushes auxiliary passive piece 63e, so that lever 63 is returned to its original position shown in FIG. 3. Upon return to the right, charging member 93 is not retracted outside the operation path of lever 63, but instead lever 63 is returned to its original position in response to the movement of charging member 93 so that the operation of mechanism 8 may not be impeded. However, charge lever 63 is not necessarily returned in response to the charging member. It is to be noted that shutter drive mechanism 12, movable mirror 17 and diaphragm drive ring 48 constitute photographing means, respectively.

Figure 10:
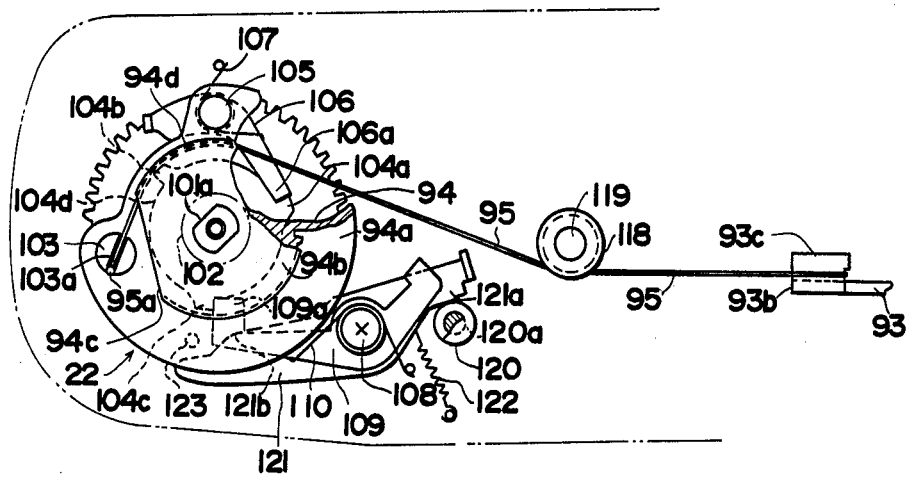
FIGS. 10 and 11 are bottom views of a film advance mechanism seen from different positions.
Figure 11:
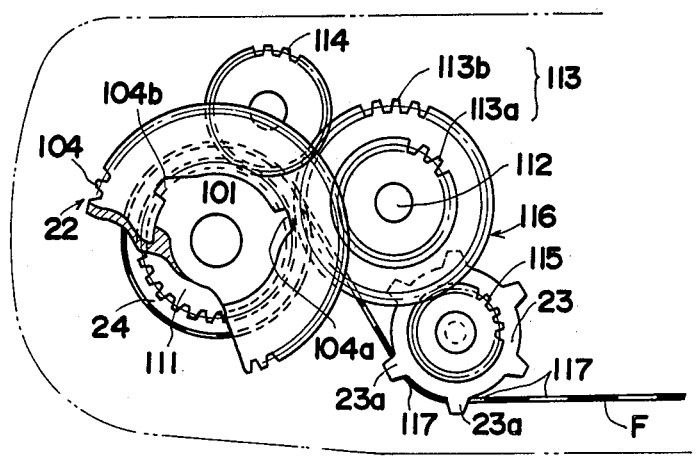

Referring to FIGS. 10 and 11 which show film advance mechanism 22, film advance wheel 94 is fitted into oval-shaped portion 101a on the top of film take-up spool 101 and fixed thereto by screw 102 which is best shown in FIG. 2. Film take-up spool 101 is biased counterclockwise by a spring (not shown) so that it tends to return to its original position. Film advance wheel 94 has small diameter pulley 94b formed integrally on the top surface of large diameter portion 94a. Film advance cord 95 has one end inserted into slot 103a cut on the head of screw 103 positioned to oppose cut portion 94c on the circumference of small diameter pulley 94b on the top of large diameter wheel 94a. Knotted end 95a of film advance cord 95 is hooked to the end of slot 103a with a portion of cord 95 adjacent to end 95a set on guide groove 94d on the circumference of pulley 94b so that film advance cord 95 is stretched between screw 103 and film advance projection 93c of charging member 93. When charging member 93 is returned to the right, film advance cord 95 is pulled in the same direction, causing spool shaft 101 to rotate clockwise (film take-up direction).

In addition, spool shaft 101 is provided with film take-up gear 104 which is independently rotatable beneath film advance wheel 94 (FIG. 11). Formed integrally on the top surface of film take-up gear 104 is ratchet wheel 104d having pawls 104a, 104b and 104c at positions trisected along the circumference. Film advance lever 106 is pivotally supported by shaft 105 on the rear circumference of large diameter portion 94a of the wheel, and is biased clockwise by spring 107 so that tip end 106a engages pawl 104a of ratchet wheel 104d. Reverse rotation stop lever 109 pivotally supported by shaft 108 on a base plate (not shown) is biased clockwise by spring 110 so that its locking pawl 109a engages pawl 104c of ratchet wheel 104d, whereby film take-up gear 104 is prevented from reverse rotation even when film advance wheel 94 is returned in the counterclockwise direction after film advance.

Moreover, mounted on spool shaft 101 respectively are film take-up driven gear 111 which is independently rotatable beneath film take-up gear 104 and film take-up spool 24 which is independently rotatable of spool shaft 101 and in frictional engagement with film take-up driven gear 111. Engaged with film take-up gear 104 is small diameter gear 113a of 2-step gear 113 mounted by shaft 112 on a base plate (not shown), and large diameter gear 113b engages intermediate gear 114 which in turn engages film take-up driven gear 111. Large diameter gear 113b also engages driven gear 115 which is connected with sprocket 23 through a clutch (not shown) for transmitting the rotation only in the film advance direction to the sprocket, and thus film advance transmission gear system 116 is formed by these two gears 113b and 115. Each tooth 23a of sprocket 23 engages perforation 117 of film F.

Thus, when wheel 94 is rotated clockwise by the return movement of charging member 93, film advance lever 106 rotates film take-up gear 104 in the same direction through its engagement with pawl 104a of ratchet wheel 104d, and thus sprocket 23 is rotated clockwise through film advance transmission gear system 116 while spool 24 is rotated counterclockwise, whereby film F is advanced by one frame and taken up over spool 24. Subsequently, when charging member 93 is moved forward to charge diaphragm-mirror drive mechanism 8, wheel 94 is rotated in the counterclockwise direction by a spring (not shown) to return to its initial position, while stretching cord 95 which tends to become loose, and wheel 94 is then in a standby condition with end 106a of film advance lever 106 engaged with pawl 104b of ratchet wheel 104d. In the meantime, when film F is advanced by one frame, lock pawl 109a of reverse rotation stop lever 109 engages pawl 104a of ratchet wheel 104d, thereby preventing film advance gear 104 from rotating in the reverse direction in response to the return movement of wheel 94.

It should be noted that guide roller 118 for guiding an intermediate portion of cord 95 is mounted by shaft 119 on a base plate (not shown). Holding lever 121 is linked with film advance release button 120. As shown in FIG. 1, film advance release button 120 is biased by a spring (not shown) so that it always projects downward from bottom cover 3 of camera body 1, and has cut-step portion 120a in part. Holding lever 121 is pivotally supported by shaft 108, and is biased clockwise by spring 122 so that its engaging end 121 abuts on the circumference of film advance release button 120. When release button 120 is depressed, sprocket 23 is disconnected from driven gear 115 through a clutch (not shown), allowing film rewinding by the operation of film rewinding knob 15. At this time, even if reverse rotation stop lever 109 and film advance lever 106 are in engagement with the pawls of ratchet wheel 104d for preventing their reverse rotation, film take-up gear 104 does not impede film rewinding because spool 24 and film take-up driven gear 111 are only in frictional engagement with each other. When film advance release button 120 is depressed, holding lever 121 is rotated by spring 122 and its engaging end 121a fits into cut-step portion 120a of release button 120 so that release button 120 may remain depressed. Film advance release reset pin 123 is planted on the circumference of large diameter portion 94a of wheel 94, thereby opposing cam section 121b at the other end of holding lever 121. When motor drive mechanism 9 is rotated for the film advance operation after completion of the film rewinding, pin 123 pushes cam section 121b of holding lever 121, causing the same to rotate counterclockwise, whereby engaging end 121a comes out of cut-step portion 120a of release button 120 so that release button 120 is allowed to project again under the force of the spring (not shown). Upon depression of shutter release button 14, motor drive mechanism 9 is at first made operative. In subsequence thereto, diaphragm-mirror drive mechanism 8 and shutter drive mechanism 12 are timely released. When film exposure is completed, motor M is rotated forward to shift charging member 93 forward for charging diaphragm-mirror drive mechanism 8 and shutter drive mechanism 12, as well as for shifting film advance wheel 94 of film advance mechanism 22 back for subsequent film advance. When this has been completed, motor M is switched from its forward to reverse rotation to shift charging member 93 reverse so that charging member 93 and charge lever 63 may be retracted from charge lever 60 of shutter drive mechanism 12 and passive pin 47 of mirror drive lever 32 respectively, whereby the operations of both mechanisms 8 and 12 are not impeded. At the same time, film advance mechanism 22 is driven to wind up film F by one frame, and after the film advance has been completed, motor M stops and will be in a standby condition for next photography.

Figure 12:
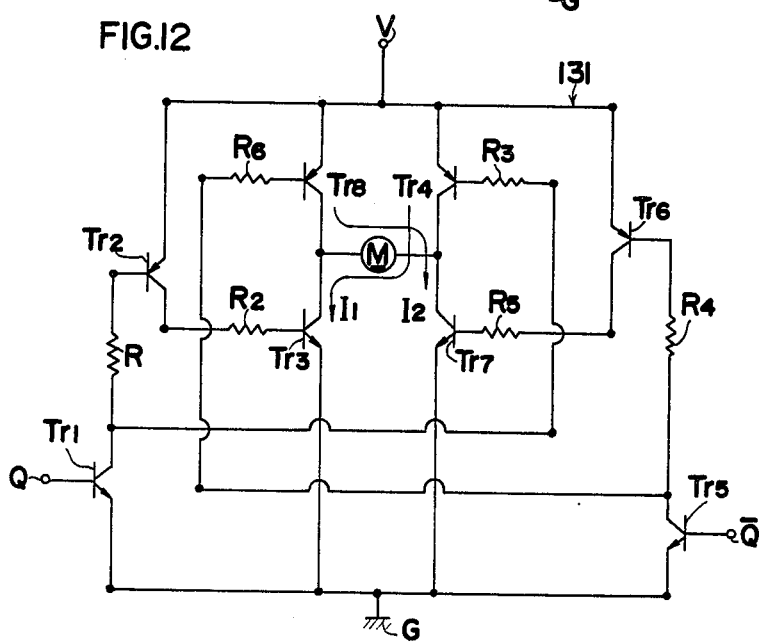
FIG. 12 is diagram of a motor drive circuit for the forward and reverse motor rotation.

FIG. 12 shows forward-reverse drive circuit 131 of motor M, which has input terminals Q and $\overline{Q}$. When a high level signal (hereinafter called a high signal) is applied to input terminal Q and a low level signal (hereinafter called a low signal) to input terminal $\overline{Q}$, transistors Tr1 through Tr4 turn on and transistors Tr5 through Tr8 off. This allows current I1 to flow into motor M for its forward rotation. when a low signal is applied to terminal Q and a high signal to terminal $\overline{Q}$, respectively, transistors Tr1 through Tr4 turn off and transistors Tr5 through Tr8 on. This allows current I2 to flow into motor M for its reverse rotation. Furthermore, when low signals are applied to both terminals Q and $\overline{Q}$, all transistors Tr1 through Tr8 turn off to cut power supply to motor M, which will then stop.

It is to be noted that V denotes terminal to which a power voltage is given, G grounding and R1 through R6, resistors.

Figure 13:
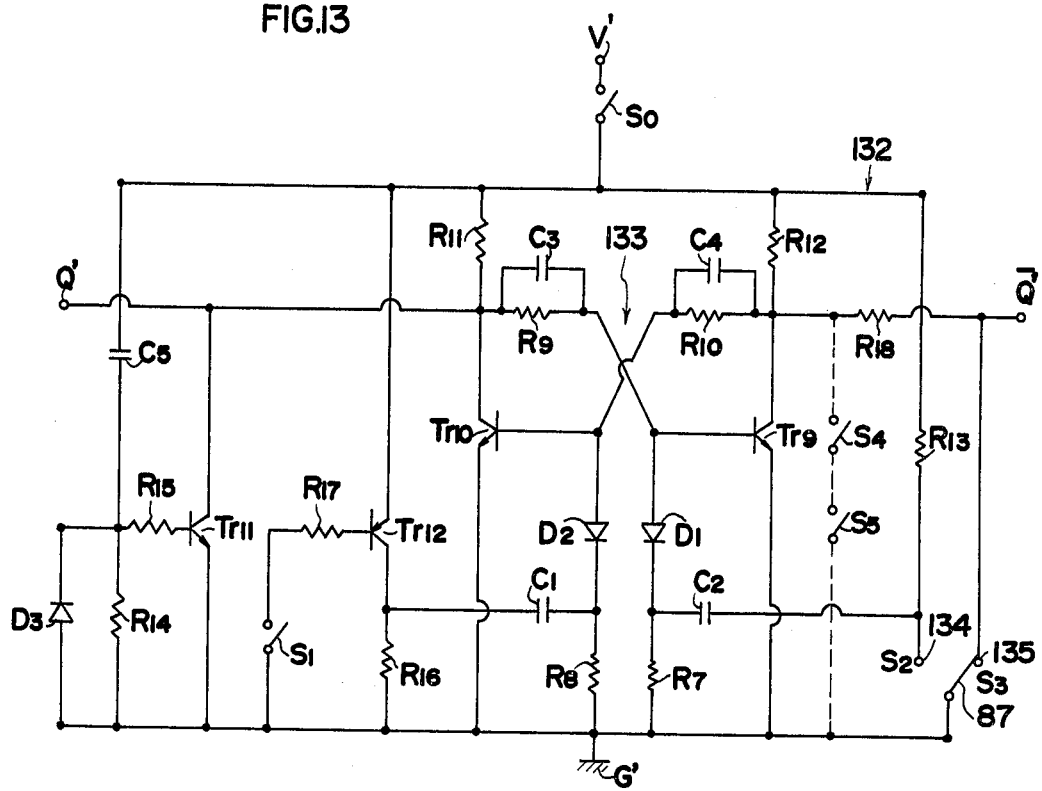
FIG. 13 is a diagram of a motor control circuit.

FIG. 13 shows motor control circuit 132, wherein input and output signals applied to respective terminals Q and $\overline{Q}$ of forward-reverse motor rotation control circuit 131 shown in FIG. 12 are timely switched over to control the forward and reverse rotations, and stop of motor M. Included in the circuitry is flip-flop circuit 133 which has output terminal Q' connected to terminal Q on one side of drive circuit 131, and output terminal $\overline{Q}'$ connected to terminal $\overline{Q}$ on the other side thereof. Outputs from output terminals Q' and $\overline{Q}'$ are switched through a negative trigger system. Switches S1, S2 and S3 are provided as negative trigger elements.

Switch S1, turns off in response to completion of a trailing shutter curtain travel to provide a film exposure end signal for causing motor M to start forward rotation while it turns on in synchronism with completion of a leading shutter curtain travel. Switch S2 turns on to provide a charge end signal, only when charging member 93 remains at the end of its forward movement, in order to reverse the rotation of motor M after diaphragm-mirror drive mechanism 8 and shutter drive mechanism 12 have been charged through the forward movement of charging member 93 in response to the forward rotation of motor M. Switch S3 turns on to provide a film advance signal, only when charging member 93 remains at the end of its reverse movement in order to stop motor M after charging member 93 has returned and completed film advance.

As shown in FIG. 13, switches S1, S2, S3 are connected to the reset signal input section of flip-flop circuit 133, the set signal input section of circuit 133, and the output section at terminal Q' of circuit 133 respectively for applying negative trigger signals thereto. Positive contacts 134 and 135 of switches S2 and S3 are respectively mounted through an insulating structure (not shown) to base 74c of base plate 74 with paired screws 136 and 137, and 138 and 139 at positions where slider 87 for reciprocating charging member 93 contacts positive contacts 134 and 135 at the ends of its forward and reverse movements. Slider 87 is used also as the negative contact for switches S2 and S3. To this end, slider 87 is made of insulating material and provided with conductive portions (not shown) connected to grounding G' of motor control circuit 132 at external areas contacting positive contacts 134 and 135, respectively.

It should be understood that V' is a terminal to which a power voltage is applied. Power switch S0 is turned on at the initial stage of depression of shutter release button 14 so that motor control circuit 132 can be made operative prior to the start of camera photographic operation. However, power switch S0 may be modified so that it is turned on by manual operation independent of depression of shutter release button 14. Tr9 through Tr12 denote transistors, D1, D2 and D3, diodes and R7 through R18, resistors, and C1 through C5, capacitors.

Referring to a series of operations, FIG. 13 shows the state before photographic operation begins, wherein power switch S0 is off so that motor control circuit 132 remains inoperative and motor M is stopped in the condition where charging member 93 is reset to the end of its return or reverse movement, i.e., the initial position. Furthermore, diaphragm-mirror drive mechanism 8 and shutter drive mechanism 12 are in the charged condition.

Under this condition, switch S0 is first turned on at the initial state of the depression of shutter release button 14.

At this time, the base current of transistor Tr11 flows instantaneously into motor control circuit 132 through resistor R15 by means of a differentiation circuit comprising capacitor C5 and resistor R14, thereby causing transistor Tr11 to turn on and output terminal Q' to become at a low voltage level instantly. As a result, base potential of transistor Tr9 drops, causing transistors Tr9 to be off and thus potential tends to rise at output terminal $\overline{Q}'$. Since, however, switch S3 is turned on with charging member 93 being in its initial position, the voltage level remains low at output terminal $\overline{Q}'$. Consequently, both input terminals Q and $\overline{Q}$ of motor drive circuit 131 are given low signals, and motor M remains stopped without flow of currents I1 and I2 thereto.

When shutter release button 14 is depressed beyond the initial stage, mirror release lever 64 shown in FIG. 3 is rotated counterclockwise against spring 66 and releases mirror drive lever 32 from its locked conditions at the charged position shown in FIG. 3. Consequently, mirror drive lever 32 is rotated clockwise under the action of spring 35 to lift mirror 7 upwards and diaphragm drive lever 34, following pin 47 of mirror drive lever 32, is also rotated clockwise under the action of spring 43, thereby causing diaphragm blades 52 to be stopped down to a preset aperture size. At the end of the rotation of mirror drive lever 32 after the above operations have been completed, cam surface 55b of shutter release lever 55 comes off actuating pin 53 provided on mirror drive lever 32 and rotates counterclockwise under the action of spring 56, causing leading shutter curtain stop lever 58 to rotate clockwise, whereby leading shutter curtain 59 is released from its locked condition.

Thus, leading shutter curtain 59 first travels, followed by the trailing shutter curtain through the operation of exposure control mechanism 17 after a lapse of required exposure time, and film exposure is completed. At the time of the completion of the leading shutter curtain travel, switch S1 of motor control circuit 132 turns on, allowing a current flow to the base of transistor Tr12 through resistor R17, whereby resistor R16 raises collector potential at transistor Tr12 to a high level. Subsequently, upon the completion of the trailing shutter curtain travel, switch S1 is reset to be off and transistor Tr12 turns off, causing a collector voltage at transistor Tr12 to drop.

Cathode potential of diode D2 is thereby lowered through a differentiation circuit comprising capacitor C1 and resistor R8, and thus diode D2 turns on instantaneously, and transistor Tr10 is turned off.

When transistor Tr10 is turned off as described above, its collector voltage rises so that high level potential appears at output terminal Q'. On the other hand, the rise in potential at output terminal Q' causes base voltage of transistor Tr9 to increase, and thus transistor Tr9 turns on, allowing potential at output terminal $\overline{Q}'$ to remain at a low level. Consequently, simultaneously with the completion of film exposure, a high signal is applied to input terminal Q and a low signal to output terminal $\overline{Q}$ of motor drive circuit 131. As a result, motor M is rotated in the forward direction with a current I1 flow thereto.

With the forward rotation of motor M, motor drive mechanism 9 shifts slider 87 to the left together with charging member 93 through gear system 75. When the forward movement begins, slider 87 leaves contact 135 of switch S3, which, in turn, turns off. As, however, output terminal $\overline{Q}'$ of motor control circuit 131 remains at a low signal level, motor M continues to rotate forward. Charging member 93 also continues to move forward together with slider 87 and charges diaphragm-mirror drive mechanism 8 through diaphragm-mirror charge lever 63, and shutter drive mechanism 12 through shutter charge lever 60, respectively. In parallel therewith, film advance wheel 94 is returned under the action of a spring (not shown) to its initial position prior to film advance.

Both mechanisms 8 and 12 come to the charged positions to be locked thereat by mirror release lever 64 and leading shutter curtain stop lever 58 and will be in standby condition, whereby charging has been completed. With charging completed, slider 87 contacts contact 134 causing switch S2 to turn on. With switch S2 on, a differentiation circuit comprising capacitor C2 and resistors R7 and R13 instantly lowers cathode potential of diode D1, causing the same diode to turn on. This causes transistor Tr9 to turn off and transistor Tr10 to turn on, whereby output terminal Q' becomes a low potential level while output terminal $\overline{Q}'$ becomes a high potential level. As a result, an input signal applied to input terminal Q at one side of motor drive circuit 131 is inverted to a "low" level, while an input signal applied to input terminal $\overline{Q}$ at the other side is inverted to a "high" level. Hence, motor M is switched from the forward to reverse rotation by current I2 flowing thereto.

When motor M is rotated reverse, slider 87 is moved reverse together with charging member 93. With the start of the reverse movement, slider 87 leaves contact 134 causing switch S2 to turn off. Without affected by this, however, motor M continues to rotate reverse to thereby return charging member 93 by means of slider 87. Charging member 93 returns diaphragm-mirror charge lever 63 to its initial position so that the operation of diaphragm-mirror drive mechanism 8 may not be impeded. In addition, charging member 93 goes away from passive pin 62 of shutter charge lever 60 and is retracted outside the operation path of lever 60, whereby the operation of shutter drive mechanism 12 is not impeded. On the other hand, charging member 93 draws cord 95 to the right to rotate film advance wheel 94 clockwise against the action of the spring so that film F is advanced by one frame through film advance mechanism 22.

With diaphragm-mirror charge lever 63 and charging member 93 retracted from mechanisms 8 and 12 and the film advanced by one frame as described, charging member 93 and slider 87 reach the end of their return or reverse movement, and slider 87 touches contact 135 of switch S3. Switch S3 is thereby reset to be turned on, and thus potential at output terminal $\overline{Q}'$ of motor control circuit 131 is lowered, and low signals are again applied to both input terminal $\overline{Q}$ and input terminal Q of motor drive circuit 132. Accordingly neither current I1 nor I2 flows into motor M, which will then stop and be in a standby condition for next photography. Power switch S0 is then reset to be off with shutter release button 14 released from depression after completion of photography.

It should be noted that resistors R11 and R12 constitute the collector resistance of transistors Tr6 and Tr10 and that resistors R9 and R10 constitute the base resistance of transistors Tr9 and Tr10, respectively. Capacitors C3 and C4 are called speed-up capacitors.

In addition, switches S4 and S5 added to FIG. 13 with broken lines for convenience are included in a second embodiment of the present invention, which allows automatic film rewinding as described below.

The second embodiment is illustrated, for the most part, in FIGS. 14 through 17. Same reference numbers are used for members and mechanisms corresponding to those of the first embodiment. One end of rotor shaft 79 of motor M in motor drive mechanism 9 projects out of one end wall 74a of base plate 74 and film rewind drive gear 141 is attached to the projecting end thereof. Film rewind shaft 21 is rotatably supported by floor wall 19a of film housing chamber 19. Driven gear 142 is mounted on the shaft end located between floor wall 19a and bottom cover 3 of a camera and also the shaft end rotatably supports one end of clutch lever 144 which, at the other end, holds movable gear 143 engaged with driven gear 142. Intermediate gear 146 supported by shaft 145 has large diameter gear 146a engaged with drive gear 141 and small diameter gear 146b integrally formed with intermediate gear 146. In dependence upon the angular position of clutch lever 141, movable gear 143 is engaged with or disengaged from small diameter gear 146b of intermediate gear 146 while it continues to engage driven gear 142. Thus, film rewind gear system 147 with a clutch mechanism is formed.

Moreover, charge and film advance drive gear system 75 for interconnecting rotor shaft 79 of motor M with feed screw 78 has second intermediate gear 86 which is engaged with feed screw driven gear 81. Gear 86 is mounted by shaft 85 on one free end of another clutch lever 148 pivotally supported on an external side wall 74a of base plate 74 by means of screw 76 whose one end receives feed screw 78. In dependence upon the angular position of clutch lever 148, second intermediate gear 86 is engaged with or disengaged from small diameter gear 84b of first intermediate gear 84.

Figure 14:
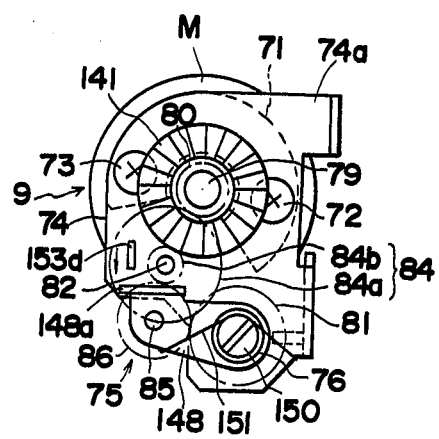
FIG. 14 is a side view of a motor drive mechanism according to another embodiment of the present invention.
Figure 15:
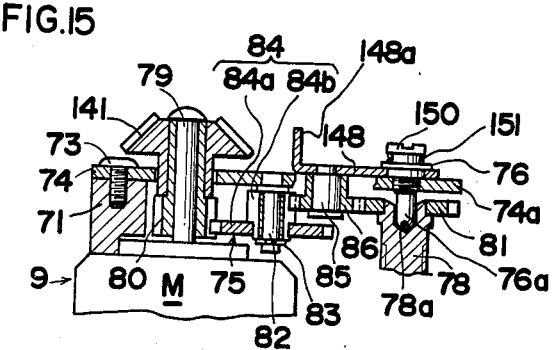
FIG. 15 is a cross-sectional view of the motor drive mechanism shown in FIG. 14.
Figure 16:
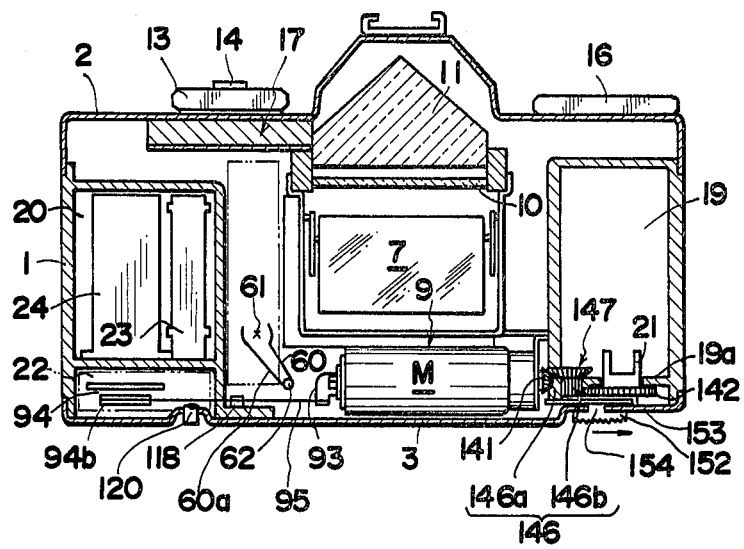
FIG. 16 is a longitudinal sectional view of a single-lens reflex camera.
Figure 17:
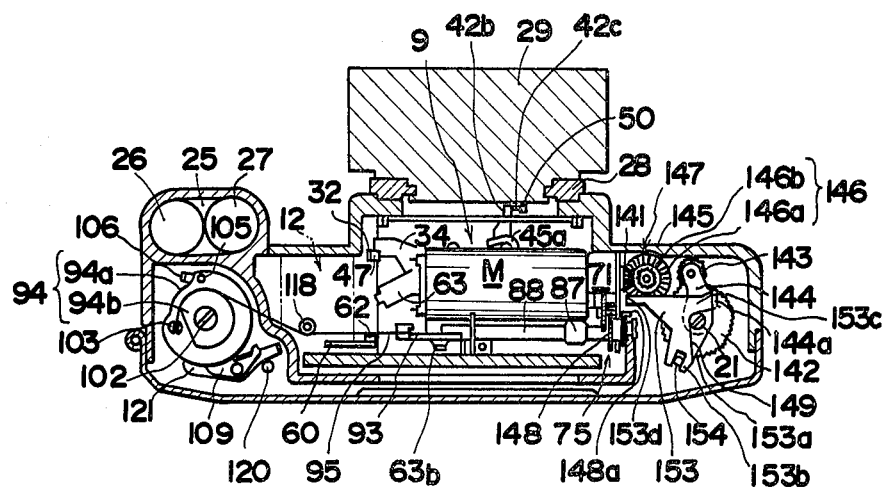
FIG. 17 is a transverse bottom view of the camera shown in FIG. 16.

Furthermore, clutch lever 144 is biased counterclockwise by spring 149 in FIG. 17 so that movable gear 143 is engaged with small diameter gear 146b of intermediate gear 146. With reference to FIG. 14, clutch lever 148 is biased clockwise by spring 151 attached by screw 150 which is screwed on the head of screw 76, so that second intermediate gear 86 is engaged with small diameter gear 84b of first intermediate gear 84. Film rewind operating member 152 is mounted slidably to the right and the left as shown in FIG. 16, on the portion opposed to film housing chamber 19 disposed beneath bottom cover 3 of a camera. In addition, clutch operating lever 153 is pivotally supported on the end of film rewind lever shaft 21. Branching portion 153b formed at the end of passive arm 153a of lever 153 is engaged with actuating pin 154 of film rewind operating member 152. In the meantime, the end of first operating arm 153c and passive bent piece 144a formed on one side of clutch lever 144 are opposed so as to be mutually contacted by one another, while the end of second operating arm 153d and passive bent piece 148a formed on one side of clutch lever 148 are opposed so as to be mutually contacted by one another. When film rewind operating member 152 is located at a left rest position in FIGS. 16 and 17, clutch operating lever 153 is located at a clockwise rotated position and holds clutch lever 144 in a clockwise rotated position, thereby disengaging movable gear 143 from small diameter gear 146b. On the other hand, at the clockwise rotated position, lever 153 is retracted from clutch lever 148 and permits second intermediate gear 86 to engage feed screw driven gear 81 and small diameter gear 84b of first intermediate gear 84 under the action of spring 151.

Consequently, film rewind gear system 147 is normally in the inoperative state, while charge and film rewind drive gear system 75 is in the operative state. On the other hand, switches S4 and S5 are connected in series between output terminal Q' of motor control circuit 132 and grounding G' as shown in FIG. 13 with the broken line. Switch S4 is turned on while film advance release button 120 is depressed for film rewinding and is turned off during any other period. Switch S5 is turned off while film advance operating member 152 is set at the left rest position, and is turned on when film rewind operating member 152 comes to a right film rewind position. Thus both switches S4 and S5 remain turned off unless a photographer intends automatic film rewinding. In this embodiment, photography is carried out in the exactly same manner as done with the first embodiment under the normal condition where automatic film rewinding is not intended.

In the case of automatic film rewinding, film advance release button 120 is depressed to turn switch S4 on and film rewind operating member 152 is shifted to the right to turn switch S5 on. In addition, the rightward shift of film rewind operating member 152 causes clutch operating lever 153 to rotate counterclockwise. Clutch operating lever 153 then rotates clutch lever 148 counterclockwise by second operating arm 153d, causing second intermediate gear 86 to be disengaged from feed screw driven gear 81 and small diameter gear 84b so that gear system 75 is made inoperative. In the meantime, clutch lever 144 is thereby released from first operating arm 153c of clutch operating lever 153, and is rotated counterclockwise under the action of spring 149. As a result, movable gear 143 engages small diameter gear 146b of intermediate gear 146 so that gear system 147 is made operative.

When power switch S0 continues to be turned on under the above condition, potential rapidly rises at output terminal Q' of motor control circuit 132 at the same time switch S5 is turned on by the rightward movement of film rewind operating member 152, and potential at output terminal $\overline{Q'}$ drops to a low level through switches S4 and S5 independently of switch S3. As a result, a high signal is applied to input terminal Q of motor drive circuit 131 and a low signal to the other output terminal $\overline{Q}$ thereof, and thus motor M is rotated forward with current I1 flowing thereto. At this time, the rotation of motor M is not transmitted to feed screw 78, and switches S1, S2 and S3 remain unchanged as shown in FIG. 13. Consequently, motor M continues to rotate in the forward direction unless switches S4 and S5 are turned off, whereby film rewind shaft 21 also continues to rotate counterclockwise for rewinding a film into a patrone.

When film rewind operating member 152 is returned to the leftward rest position shown in FIG. 16 after a film rewinding, clutch operating lever 153 is also returned to the position shown in FIG. 17, causing gear system 147 to be inoperative. On the other hand, gear system 75 is made operative, and switch S5 is turned off to open the circuit shown in FIG. 13 with the broken line. As, however, switch S3 remains on, motor M continues to rotate forward, actuating feed screw 78 through gear system 75, whereby slider 87 and charging member 93 begin to move to the left. When slider 87 and charging member 93 have completed their one reciprocating movement, motor M stops as described in connection with the first embodiment. At this moment, film advance release button 120 is also reset, and switch S4 returns to its off position.

It should be understood that it is possible to change over the transmission from motor M to the respective gear systems in response to the operation of release button 120.

In accordance with the present invention, both charging of a charge-type drive mechanism for driving a diaphragm, a movable mirror and a shutter and film advance are performed automatically by use of a single motor. In particular, the charge-type drive mechanism is charged by the forward movement of a reciprocating means which reciprocates in response to the forward and reverse rotations of the motor. Upon the return movement following the forward movement, the reciprocating means winds up a film while being retracted from the charge-type drive mechanism so as not to impede the operation thereof. Therefore, it is unnecessary to provide a clutch mechanism required in the prior art cameras between the reciprocating means and the charge-type drive mechanism. As a single motor is sufficient for the operation, the construction is simplified. The charge-type drive mechanism is charged by the forward movement of the reciprocating means and a film is advanced by the reverse movement thereof, requiring short strokes for the reciprocating means. This results in a compact construction which is advantageous in its assembling into a camera. Moreover, since the reciprocating means requires approximately equal energy for charging the charge-type drive mechanisms by its forward movement and advancing film by its reverse movement, respectively, the motor capacity may correspond to half the full energy required therefor. Thus, drive efficiency is increased and forward and reverse strokes can be equalized to one another. As a result, the reciprocating means is completely resettable to its initial state in one photographic cycle.

We claim:

1. A camera comprising:
    a motor rotatable in both forward and reverse directions;
    reciprocating means reciprocatable in response to the forward and reverse rotations of said motor;
    a charge-type drive mechanism including a drive member engageable by said reciprocating means to move forward therewith upon the forward movement of said reciprocating means, spring means coupled to said drive member to be tensioned by the forward movement of said drive member to store a driving force urging the return movement of said drive member, and photographing means set to a photographing standby position by the forward movement of said drive member and driven from the photographing standby position for effecting photographing by the return movement of said drive member, said reciprocating means retracting from the path of the return movement of said drive member upon the return movement thereof so as not to impede the return movement of said drive member;
    a film wind-up mechanism for winding-up a film in response to the return movement of said reciprocating means; and,
    a circuit including means for rotating said motor in the forward direction immediately after termination of photographing and in the reverse direction after the setting of said photographing means to the photographing standby positioned by said drive member.

2. A camera as defined in claim 1, wherein said circuit further includes means for stopping said motor in response to termination of the film wind-up by said film wind-up mechanism.

3. A camera as defined in claim 2, further comprising means for transmitting the forward and reverse rotations of said motor to said reciprocating means so that said reciprocating means is driven in the forward and reverse directions by said motor.

4. A camera as defined in claim 3, wherein said reciprocating means includes a reciprocating member reciprocatable in a linear path in response to the forward and reverse rotations of said motor and wherein said transmission means includes a feed screw mechanism which converts the forward and reverse rotations of said motor into a linear reciprocating movement of said reciprocating member.

5. A camera as defined in claim 4, wherein said motor includes a rotor shaft and wherein said feed screw mechanism includes a feed screw operatively coupled with said rotor shaft to rotate therewith, a slider integral with said reciprocating member and threaded with said feed screw, and guide means for guiding said slider for only straight movement.

6. A camera as defined in claim 4, further comprising a shutter, wherein said photographing means includes a shutter drive mechanism for driving said shutter for an exposure by the return movement of said charge member.

7. A camera as defined in claim 6, wherein said means for rotating said motor in the forward and reverse direction includes:
- a motor forward rotating circuit;
- a motor reverse rotating circuit;
- a first switch actuated in response to operation of said shutter for generating a first signal;
- a second switch actuated immediately before arrival of said reciprocating member at its forward-most advanced position for generating a second signal;
- a flip-flop circuit which has a pair of input terminals receiving said first and second signals respectively and which actuates said motor forward rotating circuit in response to said first signal while actuating said motor reverse rotating circuit in response to said second signal.

8. A camera as defined in claim 7, wherein said shutter includes a leading shutter member and a trailing shutter member and wherein said first switch is actuated in response to termination of travel of said trailing shutter member.

9. A camera as defined in claim 2 further comprising:
- a film rewinding shaft;
- clutch means capable of selectively connecting said motor to said reciprocating means and to said film rewinding shaft; and
- a manual selection member associated with said clutch means and manually operable between a first position at which said clutch means connects said motor to said reciprocating means and a second position at which said clutch means connects said motor to said film rewinding shaft.

10. A camera as defined in claim 9, wherein said clutch means includes a first clutch capable of releasably connecting said motor to said reciprocating means and a second clutch capable of releasably connecting said motor to said film rewinding shaft.

11. A camera as defined in claim 9, further comprising:
- a film advance release button;
- a first switch actuated in response to manual operation of said film advance release button; and
- a second switch actuated with said manual selection member manually operated to said second position, and wherein said circuit is adapted to rotate said motor for effecting rewinding of the film with both said first and second switches actuated.

12. A camera as defined in claim 3, wherein said operation mechanism includes a diaphragm-mirror drive mechanism for said camera, and wherein said reciprocating means includes a linear reciprocating member reciprocatable along a linear path in response to the forward and reverse rotation of said motor and a rotational reciprocating member engaged with said linear reciprocating member and reciprocatable along a circular path in response to the reciprocating movement of said linear reciprocating member, said drive member being engageable with said rotational reciprocating member to be pushed thereby upon the forward rotational movement of said rotational reciprocating member while said rotational reciprocating member retracting from the path of the return movement of said drive member upon the return rotational movement thereof so as not to impede the return movement of said drive member.

* * * * *